Patented Jan. 13, 1953

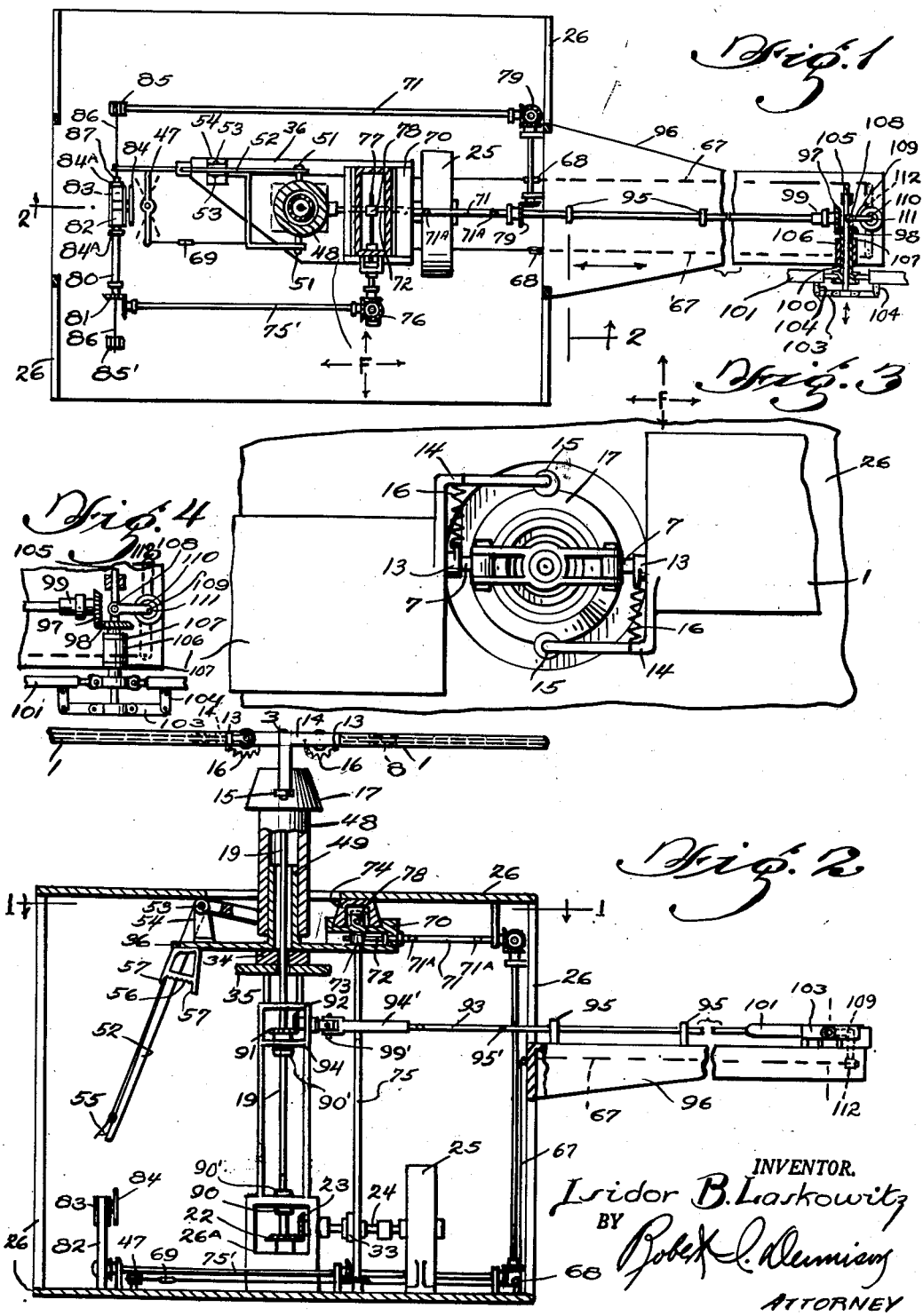

2,625,227

UNITED STATES PATENT OFFICE 2,625,227

PITCH CHANGE MEANS FOR HELICOPTER ROTORS

Isidor B. Laskowitz, Brooklyn, N. Y.

Application January 12, 1948, Serial No. 2,035

9 Claims. (Cl. 170—135.22)

This invention relates to a main and auxiliary rotor system for helicopters and control means therefor, and embodies certain improvements in pitch change means for helicopter rotors as covered by my copending application bearing Serial Number 471,492, filed January 6, 1943, which is now United States Letters Patent No. 2,434,276 granted to me January 13, 1948.

It is a primary object of this invention to provide such mechanisms as will readily and easily provide for ascent, descent, movement to the right or left, forward or rearward of the aircraft; provide for hovering or suspension in the air without movement relative to the ground; provide controlling or adjusting mechanisms for maintaining lateral balance or stability and for maintaining longitudinal balance or stability; provide for steering or directional movement about the vertical axis of the aircraft; obtain autorotation of the lift mechanisms by providing "free-wheeling" thereof should the prime mover or motor fail, thus effecting descent safely without power in case such an emergency should arise.

A further object of the invention resides in the provision of variable thrust mechanisms by means of which the direction of thrust may be varied to provide a vertical and horizontal component in any direction of the compass without rotation of the aircraft about its vertical axis.

Another object of the invention contemplates variable thrust mechanisms whereby direction and intensity of thrust may be varied to provide a vertical and horizontal component in any direction of the compass without inclining the axis of the rotors and concurrently effect control, at will, movement of the aircraft about its vertical axis for steering movement either clockwise or counterclockwise.

A further object of the invention is to provide a variable thrust mechanism embodying a main rotor whereby the pitch angles of the blades may be increased or decreased simultaneously to increase or decrease the lift or thrust of the rotor, and whereby the pitch angles of the blades of the rotor may be given a sinusoidal variation during each revolution to vary the thrust of the rotor in any direction of the compass and an auxiliary rotor arranged to balance the reaction torque of the main rotor and whereby the pitch angles of the blades of the auxiliary rotor may be varied to produce a reaction torque greater or less than that of the main rotor so as to produce a resultant movement either clockwise or counterclockwise for control of the craft about the vertical axis.

Another object of importance is to embody the features of variable thrust mechanisms having the qualities set out above which will be relatively simple in construction yet positive in action, strong and durable with parts arranged to facilitate ready and easy adjustments whenever necessary, thus assuring its practicability.

Other objects and advantages of the present invention will become apparent from the following detailed description of preferred embodiments of the invention illustrated in the accompanying drawings wherein like reference characters designate corresponding parts throughout the several views and wherein:

Figure 1 is a horizontal section of the variable thrust mechanism embodying the invention showing a main rotor shaft and an auxiliary rotor taken substantially along the line 1—1 of Figure 2;

Figure 2 is a vertical section of the mechanism taken substantially along the line 2—2 of Figure 1;

Figure 3 is a fragmentary plan view showing the angular displacement means for the blades and the pivotal connection of the blades with the main shaft; and Figure 4 is an enlarged detail of the auxiliary blade control mechanism.

Referring now more particularly to the drawings, the preferred embodiments are illustrated as embodied in helicopters wherein airfoils, vanes or blades 1 constructed of any suitable or preferred materials constitutes the main rotor. Each blade is pivotally mounted at its inner end on a pin 2 carried by the hub 3. Each blade 1 is also pivotally mounted longitudinally on spindles or spars 7 by means of ball or roller bearings 8. The blades 1 are free to move in a vertical plane between stops and free to move in a horizontal plane between stops. Collars 13 secured or fixed on the ends of the spindles or spars prevent undue longitudinal shifting of the blades 1 on the spindles 7. The blades 1 at their inner ends have the arms 14 terminating with rollers 15 at their extremities. Rollers 15 through the action of the springs 16 on the arms 14 are kept in contact with the blade pitch angle changing cone 17. The inner end of each spring is attached to the relatively fixed collar 13 of the hub supported structure, and each outer end is suitably connected to its arm 14 to maintain the roller extremity of each arm in constant contact with the cone 17. Thus, when rotating the pitch angle or angles of incidence of the blades of the main rotor depends on the position of the cone 17.

While two blades 1 are shown for the rotor, a greater number of blades may be employed without departing from the spirit of the invention. All parts fixedly secured together are preferably welded to each other although any other method of rigidly securing the members may be employed as desired.

The main rotor is carried by a vertical shaft 19. An intermediate steady bearing 34 is provided for shaft 19, and is mounted on frame member 35. Bearing 34 also serves to give additional support to the eccentric bracket or platform 36, hereinafter described.

Referring to Figures 1 and 2, a single main rotor is shown in which the vanes or blades 1 of the rotor are carried by the hub 3, which in turn is carried by the vertical shaft 19 rotatably mounted in the gear bracket or frame 26A. The lower end of shaft 19 is connected to a bevel gear 22 which meshes with a similar gear 23 carried on the drive shaft 24 of an engine or motor 25 mounted as in the other views on the base of the supporting frame 26A. Gear bracket or supporting frame 26A is provided for supporting shaft 19, shaft 24 and bevel gears 22 and 23. Thrust collars 90 and 90' are mounted on shaft 19 for carrying the load either upward or downward. A free-wheeling device 33 is also provided and is interposed in the drive shaft 24.

Intermediately mounted on shaft 19 is the bevel gear 91 which is in mesh with bevel gear 92 mounted on shaft 93 which extends longitudinally in a rearward direction in relation to the craft. Gear bracket 26A has mounted thereon the gears and shafts support 94. Shaft 93 is carried in the bearings 95 which are mounted on the bracket 96 secured to the supporting frame 26. Shaft 93 has secured thereto at its rearward end the bevel gear 97 which is in mesh with bevel gear 98. Flexible couplings 99 and 99' are provided at the ends of shaft 93 for aligning purposes. Bevel gear 98 is secured to the sleeve portion 100 which carries the auxiliary rotor 101 consisting of two blades pivotally mounted so that the pitch angles of the blades may be varied by moving cross member 103 in the direction of the arrows shown in Figure 1 and Figure 4. Cross member 103 is secured to the blades by means of the end-pinned links 104. Cross member 103 has secured thereto rod member 105 which is slidably mounted in the sleeve portion 100 of the auxiliary rotor 101. Sleeve portion 100 is rotatably mounted in the bearing 106. Thrust collars 107 are secured to the sleeve portion 100 at both ends of the bearing 106. Rod member 105 rotates with the auxiliary rotor 101. Mounted on rod member 105 is a split stationary collar 108 which engages a lever 109 secured to the shaft 110 which is rotatably mounted in the bearing 111 which in turn is secured to the bracket 96. The lower end of shaft 110 carries the lever 112.

Secured to each end of lever 112 are wire rope cables 67 which extend in a forward direction around the sheaves 68 and are secured at their forward lower ends to the steering foot lever 47. Turnbuckles 69 are provided to take up the slack in the wire rope 67. Thus, in the arrangement shown with the motor or engine operating power will be transmitted through vertical shaft 19 to the main rotor at such speed as may be desired by the pilot, and the auxiliary rotor through the bevel gears and the shafting 93 will rotate at a fixed relation in speed to that of the main rotor. Furthermore, it is possible by shifting the steering foot lever 47 to one side or the other, to increase or decrease the pitch angles of the blades of the auxiliary rotor with the result that the reaction torque of the main rotor may be balanced by means of the auxiliary rotor or the counteracting moment created by the auxiliary rotor, may be increased or diminished to control movement of the craft about the vertical axis in a clockwise or counterclockwise direction.

The main rotor is provided with a single blade pitch angle changing cone (frustum of) 17 carried by cylindrical sleeve support 48 said cone and sleeve constituting a combined construction which does not revolve but is slidably mounted on the neck portion or tube 49 of the eccentric bracket or platform 36. The lower end of the cylindrical sleeve support 48 is attached by means of the pins 51 thereon and engaged by the lever 52 which is pivotally mounted on the pin 53 between the bracket arms 54 secured to the eccentric bracket or platform 36. The lever 52 is provided with a spring actuated pilot lever 55 which engage the toothed quadrant 56 for definite settings of the lever 52. The lever 52 is provided with a weight arm extending from the fulcrum pin 53 to the attaching pins 51, Fig. 1. The power arm of lever 52 extends from the fulcrum pin 53 to a point adjacent the pilot lever 55, Fig. 2. High and low limit stops 57 are provided on the quadrant 56 for limiting the high and low positions of the cone 17. In the arrangement described, it is possible with the rotor rotating to raise and lower the cone or set it in any desired position by shifting lever 52 backward or forward.

If the neck portion or tube 49 is moved in a horizontal plane off center the pitch angles of the blades of the main rotor are varied from a maximum to a minimum in every complete revolution. This eccentricity produces a sinusoidal variation of the pitch angles of the blades of the rotor during each revolution and may be utilized to vary the lift or thrust of the rotor in any direction of the compass. The effect is the same as inclining the axis of the rotor.

For the purpose of moving the center "F" of the neck portion or tube 49 of eccentric bracket or platform 36 in a horizontal plane, I prefer to employ the wheel and rocking bridge control mechanism together with one of the eccentric brackets, more fully and specifically described and claimed in United States Letters Patent No. 1,872,758 granted to me August 23, 1932, for Variable Thrust Mechanism.

Briefly, such mechanism may be applied in the present disclosure by carrying neck portion or tube 49 on eccentric bracket or platform 36. The platform construction or bracket 36 is made up of an upper section or member 70 and a lower section. The lower section is slidably connected to the member 70 by means (not shown) and the upper section or member 70 is slidably connected to the depending member 74. Section 70 can be moved to and fro by the threaded spindle 77 as viewed in Figs. 1 and 2. The lower section can be moved laterally in either direction by the threaded spindle 72 connected to the shaft 71 as viewed in Figs. 1 and 2. This arrangement provides for lateral movement at right angles to the direction of movement possible in Figure 2, as will be apparent from Figure 1 such movement being responsive to rotation of the shaft 75. Bevel gears 76 operatively connect shaft 75 with threaded spindle 77 which is in turn associated with an internally threaded boss 78 provided in the slotted member 70.

Bevel gears 79 provide driving connections between the various sections of the shafting 71 for transmitting rotary motion from each section to the next. Near the ends of upper shaft section 71 there are provided universal joints 71A with splined slidable shafts to provide for its inclination whenever the eccentric bracket or platform 36 is moved from side to side. Shaft section 75' of the shaft 75 is adapted to extend along the bottom of the frame 26 and is driven by the hollow shaft 80 by means of bevel gears 81. Attached to the inner end of the shaft 80 is an inverted U-shaped rocking bridge 82. A suitable grooved flexible cable drum 83 is mounted at the top of the bridge 82 and is adapted to be turned by a hand control wheel 84. Adjacent to the bottom of the rocking bridge, there are provided a pair of pulleys or guide sheaves 84A. Shaft section 71 is adapted to extend along the bottom of frame 26 toward the rocking bridge and has a grooved drive pulley 85 secured thereto. A similar grooved pulley 85', but acting only as an idle pulley, is disposed in opposed relation to pulley 85. A flexible cable 86 of wire rope preferably, is wound around the drum 83, sheaves 84A, through hollow shaft 80 and around pulleys 85 and 85'. The ends of the cable are preferably secured to a turnbuckle 87 for the purpose of adjustment when necessary.

As will be evident, the construction and arrangement is such that by turning control wheel 84 in one direction, eccentric bracket or platform 36 will move to one side or the other as indicated graphically by arrows at "F" in Figures 1 and 3. The point or position "F" can be any point or position on the lower section of bracket 36, depending upon the direction of rotation of the wheel. Also, by inclining the rocking bridge 82 or dipping it fore and aft, the eccentric bracket or platform is moved in opposite directions at right angles to the previously described movement. The bracket construction is clearly shown in my Patent No. 1,872,758 granted August 23, 1932.

Thus, it is possible to vary the lift or thrust of the mechanism in any direction, such as from a vertical position to any other inclined position. By varying the thrust or lift from a vertical position to an inclined position, longitudinal and lateral stability or control may be had. With rotation of the craft about its vertical axis by means of varying the pitch angle of the blades of the auxiliary rotor 101, stability and control of the craft about all three axes is obtained.

In the auxiliary rotor the blades 101 are arranged for blade tilting adjustment through the cross member 103 which is actuated by rod member 105. The cross member 103 is attached to the auxiliary blade leading portions by links 104. The ends of the links 104 are respectively articulately connected to provide for limited pivotal movement at each attached end.

The wheel and rocking bridge control mechanism is so arranged that movement of the wheel 84 to the right would correspond to a movement of the craft to the right and a movement of the wheel to the left would correspond to a movement of the craft to the left. Also, that a forward inclination of the rocking bridge 82 would correspond with a forward movement of the craft and that a rearward inclination of the bridge would correspond to a rearward movement of the craft.

Variable thrust mechanisms of the character described may be applied to land or water craft or to any other type of craft in which it may be useful. It will be clear that all controls are disposed in close proximity to the operator and are of a positive acting nature so as to avoid any element of failure of operation and control.

Obviously, minor changes may be made in the preferred embodiment without departing from the essence of the invention or the scope of the appended claims. Thus, ball or roller bearings may be employed in place of the sleeve bearings disclosed. Other blades may be employed in place of the pivoted blades. It is contemplated that other equivalent mechanical, hydraulic or electrical control movements might be substituted for the one shown without essentially departing from the spirit of the invention.

Having fully described my invention, what I claim is:

1. In a helicopter, a frame, a support mounted vertically in said frame, a rotary shaft mounted vertically in said support and projecting above said frame, a platform supported upon said support and having a tube projecting above said frame about the shaft, a rotor at the upper end of said shaft having blades pivoted for pitch adjustment, a cam about said tube shiftable vertically thereon for imparting pitch adjustment to the blades, means for moving said platform in a horizontal plane, a remotely controlled member carried by the platform for shifting the cam vertically, a drive for rotating said shaft, a bracket extending from said frame, a transmission shaft extending longitudinally of the bracket, a cross shaft extending transversely of the bracket and rotated from the transmission shaft, an auxiliary rotor carried by the cross shaft and having blades pivoted for pitch adjustment, means for adjusting pitch of blades of the auxiliary rotor including a rod extending longitudinally through the cross shaft and shiftable longitudinally, a stem rotatably mounted through the bracket, an arm extending laterally from the stem and engaging said rod, a cross bar carried by said stem, a pivoted foot bar, and cables connecting ends of the foot bar with ends of the cross bar whereby movement of the foot bar will turn the stem and effect longitudinal shifting of the rod to adjust blades of the auxiliary rotor.

2. In a helicopter, a frame, a support mounted in said frame, a rotary shaft mounted vertically in said support and projecting above said frame, a platform supported upon said support and having a tube projecting above said frame about said shaft, a rotor having a hub and blades at the upper end of said shaft, said rotor having spindles pivoted to said hub for limited vertical movement, said blades being respectively mounted for limited oscillation about said spindles for pitch adjustment, a combined cone and sleeve surrounding and embracing said tube for vertical movement thereon, each blade having an arm fixed thereon and projecting laterally therefrom to engage said cone, a stationary collar on each spindle adjacent the hub, a pair of tension springs attached respectively to said collars and suitably secured to said arms to maintain the free ends of said arms in constant contact respectively with said cone, a member carried by said platform and connected to said sleeve for shifting said combined cone and sleeve vertically for imparting simultaneous pitch adjustment to the blades, a prime mover in said frame and operatively connected to said shaft for rotating said shaft, means in said frame for moving said platform horizontally from a remote point in said frame for imparting, in addition to the simultaneous pitch adjustment, a sinusoidal pitch angle adjustment to the blades, a bracket extending rearwardly from said frame and secured thereto, an auxiliary shaft extending longitudinally of said bracket and geared at its inner end to the first named shaft, an auxiliary rotor having blades driven by the auxiliary shaft, and means for varying the pitch angle of said auxiliary rotor blades.

3. In a helicopter, a frame, a support mounted vertically in said frame, a rotary shaft mounted vertically in said support and projecting above said frame, a platform supported on said support and frame and having a tube projecting above the said frame and surrounding said shaft, a rotor having a hub, spindles and blades at the upper end of said shaft, said spindles being pivoted to said hub for limited vertical oscillatory movement, said spindles having fixed collars thereon adjacent said hub, said blades being swivally mounted on said spindles for limited oscillatory movement for simultaneous pitch adjustment of the blades, a combined sleeve and cone surrounding and slidably embracing said tube for vertical movement, a lever fulcrumed on said platform and having its weight arm attached to said sleeve whereby said cone may be shifted vertically, each blade having a fixed arm thereon projecting laterally therefrom and having its free end in contact with said cone, in combination with tension springs, one end of each spring being attached to one collar and its opposite end suitably attached to one of the fixed arms whereby the free ends of the fixed arms are constantly maintained in contact with the cone, means for moving said platform horizontally from a remote point within the frame to produce a sinusoidal adjustment of the blades, a prime mover within the frame operatively connected with the rotary shaft for propelling the same, a bracket extending rearwardly from said frame and secured thereto, a transmission shaft extending longitudinally of the bracket and having supporting bearings thereon, a cross shaft extending transversely of the bracket operatively connected to the transmission shaft, an auxiliary rotor having blades carried by said cross shaft, said rotor and blades being mounted to rotate in an upright plane, said auxiliary rotor having its blades pivoted for pitch adjustment, and means operatively connected to said auxiliary blades and controlled from a remote point within the frame to adjust the pitch angle of said auxiliary blades.

4. In a helicopter, a frame, a support mounted vertically in said frame, a rotary shaft mounted vertically in said support and projecting above said frame, a platform supported upon said support and having a tube projecting above said frame about the shaft, a rotor having a hub, spindles and blades secured to the upper end of said shaft, said spindles being pivoted to said hub for limited oscillatory vertical movement, said spindles having fixed collars thereon adjacent said hub, said blades being mounted for limited oscillatory movement on said spindles, a combined cone and sleeve surrounding and embracing said tube for vertical movement, each blade having a fixed arm thereon adjacent said hub and cone, each arm extending laterally from its blade and having its free end in constant contact with said cone, in combination with a pair of tension springs, one end of each spring being attached to one collar and the opposite end suitably attached to one of said arms whereby the free ends of said arms are maintained in constant contact with said cone whereby the shifting of said cone will adjust the pitch angle of said blades simultaneously, remote control means in said frame for moving said platform in a horizontal plane, a member carried by said platform and attached to said sleeve for shifting the combined cone and sleeve vertically for imparting simultaneous adjustment to the blades, a prime mover in said frame operatively connected to said rotary shaft for rotating said shaft, a bracket extending from said frame and secured thereto, a transmission shaft extending longitudinally of the bracket, a cross shaft extending transversely of the bracket and rotated from the transmission shaft, an auxiliary rotor having blades carried by the cross shaft and mounted to rotate in an upright plane, said rotor having blades pivoted for pitch adjustment, a rod extending longitudinally through the cross shaft and shiftable longitudinally, means carried by said rod for adjusting pitch angles of blades of the auxiliary rotor when the rod is shifted longitudinally, and manually actuated means for shifting the rod longitudinally.

5. In a helicopter, a frame, a support mounted vertically in said frame, a rotary shaft mounted vertically in said support and projecting above said frame, a platform supported upon said support and frame and having a tube projecting above said frame about the shaft, a rotor comprising a hub, spindles and blades secured to the upper end of said shaft, said spindles being pivoted to the hub for limited oscillatable vertical movement, each spindle having thereon a fixed collar adjacent the hub, said blades being oscillatably mounted for limited movement on said spindles, a combined cone and sleeve mounted on said tube for vertical movement, each blade having an arm fixed thereon and extending laterally therefrom and having its free end in contact with said cone, in combination with a pair of tension springs, one end of each spring being attached to one collar and its opposite end suitably attached to one arm to maintain the free ends of said arms in constant contact with said cone, a lever mounted on said platform having its weight arm attached to said sleeve whereby said combined cone and sleeve may be moved vertically for simultaneous pitch angle adjustment, means for moving said platform in a plane transversely of said shaft from a remote point, a remotely controlled member carried by the platform for shifting the cone vertically, a drive for rotating said shaft, a bracket extending rearwardly from said frame, a transmission shaft extending longitudinally of the bracket, a cross shaft extending transversely of the bracket and rotated from the transmission shaft, an auxiliary rotor carried by the cross shaft and mounted for upright rotation, said auxiliary rotor having blades pivoted for pitch adjustment, means for adjusting the pitch of the blades of the auxiliary rotor including a rod extending longitudinally through the cross shaft and shiftable longitudinally, a stem rotatably mounted through the bracket, an arm extending laterally from the stem and engaging said rod, and a cross bar carried by said stem, a pivoted foot bar, and cables connecting the ends of the foot bar with ends of the cross bar whereby movement of the foot bar will turn the stem and effect longitudinal shifting of the rod to adjust the pitch angles of the blades of the auxiliary rotor.

6. In a helicopter, a frame, a support mounted vertically in said frame, a rotary shaft mounted vertically in said support and projecting above said frame, a platform supported upon said support and having a tube projecting above said frame about the shaft, a rotor having a hub, spindles and blades secured to the upper end of rotary shaft, said spindles being pivoted to said hub for limited oscillatable vertical movement, said spindles having collars fixed thereon adjacent said hub, said blades being oscillatably mounted for limited movement on said spindles, a combined cone and sleeve slidable mounted on said tube means fixed to each of said blades and operatively held in engagement with said cone, a lever fulcrumed on said platform and having its weight arm attached to said sleeve for actuating said cone for simultaneous pitch angle adjustment of the blades, means operatively connected with said rotary shaft for rotating said shaft, and means in the frame for moving said platform in a horizontal plane from a remote point for imparting additional sinusoidal pitch angle adjustment of the blades.

7. In a helicopter, a frame, a support mounted vertically in said frame, a rotary shaft mounted vertically in said support and projecting above said frame, a platform supported upon said support and having a tube projecting above said frame about the shaft, a rotor having a hub, spindles and blades, said rotor being secured to the upper end of said rotary shaft, said spindles being hinged to said hub for limited vertical movement, said blades being mounted for limited oscillatory movement on and about said spindles, said spindles having fixed thereon collars adjacent said hub, a combined cone and sleeve surrounding and slidably embracing said tube for vertical movements, a lever fulcrumed on said platform and having its weight arm attached to said sleeve, each blade having a fixed arm thereon extending laterally therefrom into contact with said cone, in combination with a pair of tension springs, one end of each spring being attached respectively to one of said fixed collars, the opposite end of each spring being suitably attached respectively to one fixed arm to maintain the free ends of said fixed arms in constant contact with said cone whereby the pitch angle of said blades may be simultaneously adjusted upon vertical movement of said cone, a prime mover in said frame operatively connected to said rotary shaft for rotating said shaft, means in said frame for moving said platform in a horizontal plane from a remote point for imparting additional sinusoidal pitch angle adjustment to the blades, a bracket extending from said frame and secured thereto, an auxiliary shaft extending longitudinally of said bracket and geared at its inner end to the rotary shaft, an auxiliary rotor having upright blades driven from the auxiliary shaft, and means for varying pitch angle of the blades of the auxiliary rotor.

8. In a helicopter, a frame, a support mounted vertically in said frame, a rotary shaft mounted vertically in said support and projecting above said frame, a platform supported upon said support and having a tube projecting above said frame about the shaft, a rotor having a hub, spindles and blades, said rotor being secured to the upper end of said rotary shaft, said spindles being pivoted to the hub for limited vertical movement, each spindle having thereon a fixed collar adjacent to the hub, said blades being oscillatably mounted respectively on said spindles for limited movement thereon, a combined cone and sleeve slidably mounted on said tube for vertical movement, each blade having an arm fixed thereon and extending laterally therefrom and having its free end in contact with said cone, in combination with a pair of tension springs, one end of each spring being attached to one collar and the opposite end to one of said fixed arms to maintain said free ends in constant contact with said cone, a lever fulcrumed on said platform and having its weight arm attached to said sleeve for shifting said cone vertically to produce simultaneous pitch angle adjustment of said blades, means for moving said platform in a horizontal plane from a remote point within the frame to impart sinusoidal pitch angle adjustment of said blades, a prime mover within said frame and operatively connected to said rotary shaft for rotating said shaft, a bracket extending from said frame, a transmission shaft extending longitudinally of the bracket, a cross shaft extending transversely of the bracket and rotated from the transmission shaft, an auxiliary rotor carried by the cross shaft and having blades pivoted for pitch angle adjustment, and means for adjusting the pitch angle of the blades of the auxiliary rotor.

9. In a helicopter, a frame, a support mounted vertically in said frame, a rotary shaft mounted vertically in said support and projecting above said frame, a platform supported upon said support and on said frame and having a tube thereon projecting above said frame and surrounding said rotary shaft, a rotor having a hub, spindles and blades, said rotor being secured to the upper end of said rotary shaft by means of said hub, said spindles being pivotally connected to said hub for limited vertically oscillating movement, each spindle having thereon a fixed collar adjacent to said hub, said blades being oscillatably mounted respectively on said spindles for limited movement thereon, a combined cone and sleeve slidably mounted on said tube for vertical movement, each blade having an arm fixed thereon and extending laterally therefrom and having its free end in contact with said cone, in combination with a pair of tension springs, one end of each spring being attached to one fixed collar and the opposite end suitably attached to one fixed arm whereby the free ends of said fixed arm are maintained in constant contact with said cone, a lever fulcrumed on said platform and having its weight arm attached to the lower end of said sleeve whereby said combined cone and sleeve can be shifted vertically to produce a simultaneous pitch angle adjustment of said blades, means in said frame and operatively connected to said platform for shifting the same in a horizontal plane to impart sinusoidal pitch angle adjustment of said blades, a prime mover within said frame and operatively connected to said rotary shaft for actuating the same, in combination with a bracket extending rearwardly from said frame and secured thereto, a transmission shaft extending longitudinally of the bracket and operatively connected to said rotary shaft, a hollow cross shaft extending transversely of the bracket and operatively connected to said transmission shaft, an auxiliary rotor carried by said hollow cross shaft and having auxiliary blades pivotally mounted thereon for pitch angle adjustment, a rod extending longitudinally through said hollow cross shaft and shiftable longitudinally, means carried by one end of said rod and connected to said auxiliary blades for adjusting the pitch angle of the auxiliary blades when the rod is shifted longitudinally, and manually actuated means within the frame and connected to said rod for shifting the rod longitudinally.

ISIDOR B. LASKOWITZ.

REFERENCES CITED

The following references are of record in the file of this patent:

UNITED STATES PATENTS

| Number | Name | Date |
|---|---|---|
| 1,133,222 | Bevis | Mar. 23, 1915 |
| 1,879,323 | Koch | Sept. 27, 1932 |
| 1,994,488 | Sikorsky | Mar. 9, 1935 |
| 2,381,417 | Adams | Aug. 7, 1945 |
| 2,385,889 | Skavinsky | Oct. 2, 1945 |
| 2,394,846 | Cox, Jr. | Feb. 12, 1946 |
| 2,434,276 | Laskowitz | Jan. 13, 1948 |

FOREIGN PATENTS

| Number | Country | Date |
|---|---|---|
| 400,762 | France | June 22, 1909 |
| 610,434 | Germany | Mar. 12, 1935 |
| 637,938 | France | Feb. 13, 1928 |

OTHER REFERENCES

"Aviation" Magazine—November 1944—pages 125–133 Article "Basic Drives for Helicopters."